F. E. GROOVER.
MECHANISM FOR PRESSES.
APPLICATION FILED JAN. 23, 1913.
1,084,735.
Patented Jan. 20, 1914.
2 SHEETS—SHEET 2.
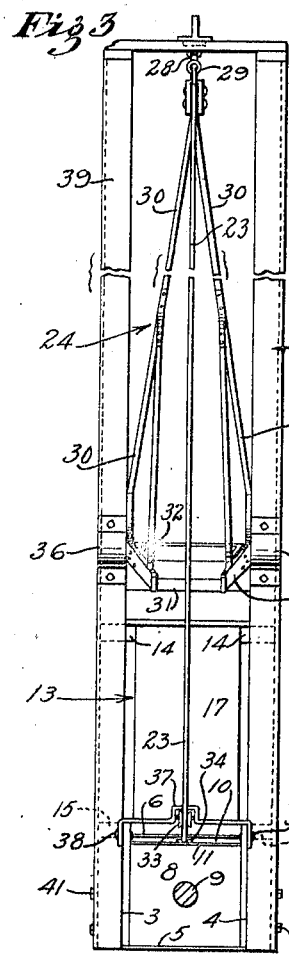
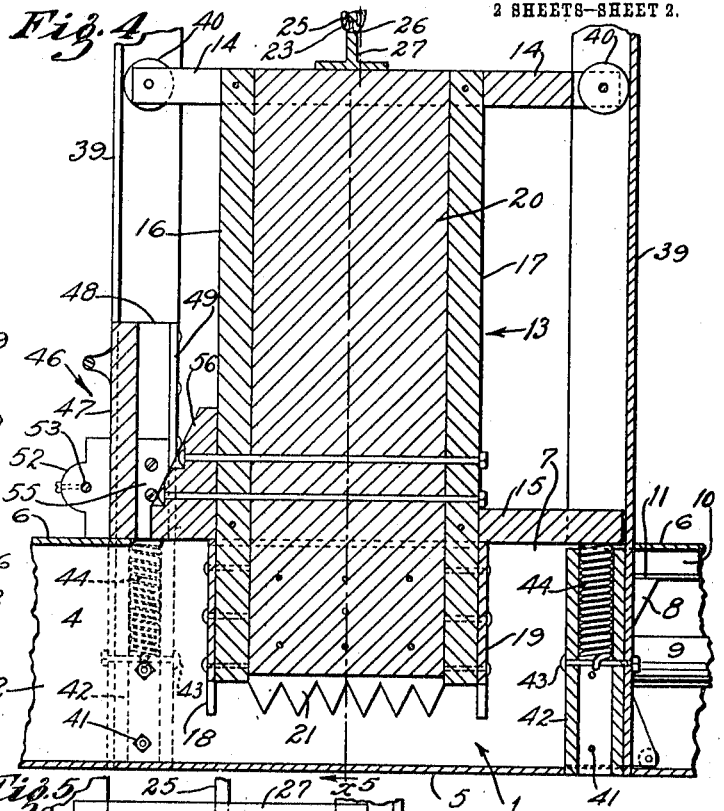
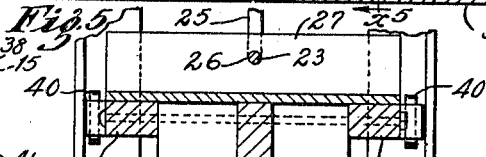
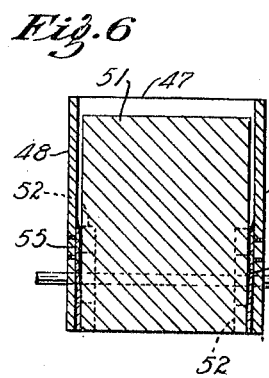
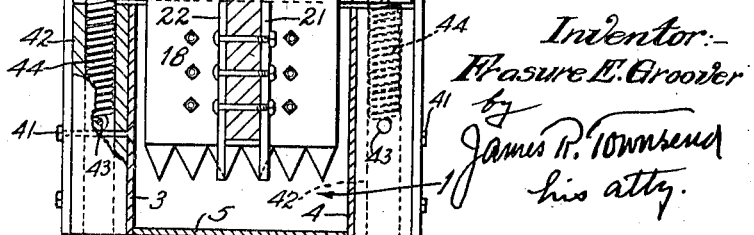
Witnesses:—
Thor Sjöberg
L. Belle Rice
Inventor:—
Frasure E. Groover
by
James R. Townsend
his atty.

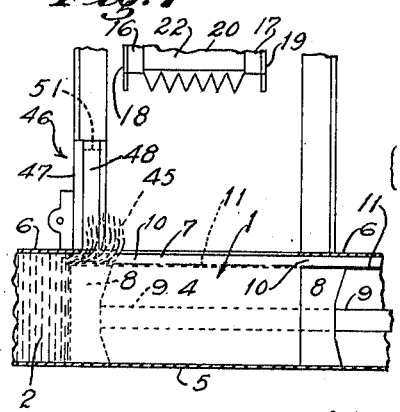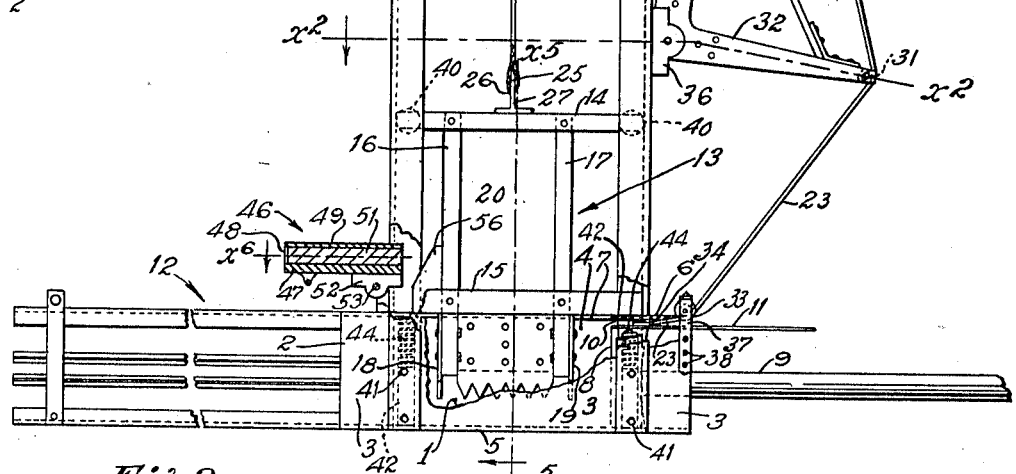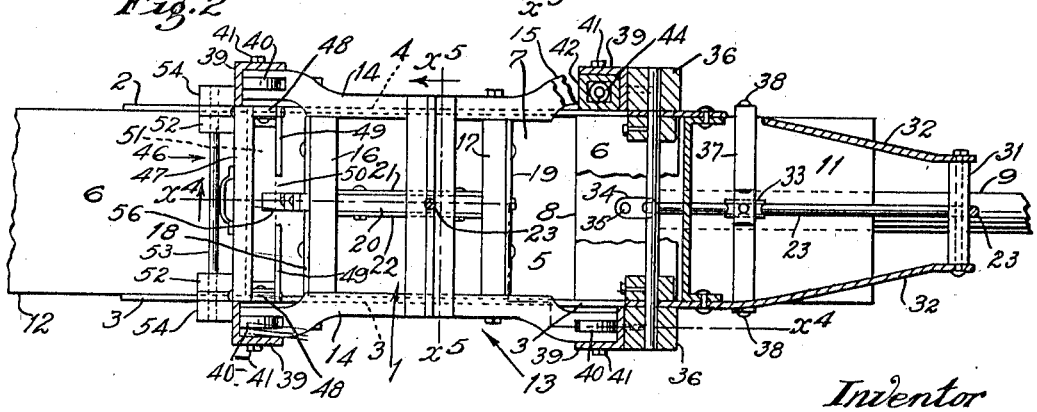

UNITED STATES PATENT OFFICE.

FRASURE E. GROOVER, OF LOS ANGELES, CALIFORNIA.

MECHANISM FOR PRESSES.

1,084,735. Specification of Letters Patent. Patented Jan. 20, 1914.

Application filed January 23, 1913. Serial No. 743,842.

*To all whom it may concern:*

Be it known that I, FRASURE E. GROOVER, a citizen of the United States, residing at Los Angeles, in the county of Los Angeles and State of California, have invented a new and useful Mechanism for Presses, of which the following is a specification.

This invention relates to presses for bailing hay, cotton, corn, etc., and is characterized both by novel feeding means whereby the hay, or other produce, is fed into the receiving chamber, and also by novel means whereby the blocks, slipped between successive bales, may be automatically brought into position without interruption of the pressing operation.

An object of this invention is to provide a feeder which shall be efficient in operation and rugged in construction, whereby the hay, or other produce, may be evenly fed and distributed over the bottom of the receiving chamber, and whereby the delays and expense incident to the up-keeping of old forms of feeders may be largely obviated. To this end is provided a feeder adapted to move in a substantially straight vertical line and to be operated by a dropping or falling action, said feeder being provided with suitable prongs for distributing the produce evenly, rather than to wad it toward one corner of the receiving chamber as has been the custom with prior feeders. These prior feeders are usually pivoted at one side of the receiving chamber and operated with a swinging motion.

Another object is to avoid the plugging of the pressing plunger as the same enters the pressing chamber. This plugging was caused largely by the uneven manner in which prior pivotally mounted feeders fed the hay into the receiving chamber; and also by the fact that feeders of this construction failed to force the hay deep down toward the bottom of the receiving chamber. Both of these causes tend to raise and wad the hay over the upper edge of the pressing plunger as the same sweeps through the receiving chamber, and this projecting wad becoming subsequently trapped between the lower edge of the pressing chamber and the upper edge of the pressing plunger would plug and bind said plunger, so that the hardest efforts of the power means, used for operating the press, were insufficient to either advance or retract the plunger from this plugged position. The possibility of plugging, and the consequent temporary crippling of the press, is practically eliminated by this invention, because the novel feeder, hereinafter described, feeds the hay uniformly across the receiving chamber and forces it deep down into the same.

Another object is to save the time lost in prior forms of presses when the spacing block was slipped between successive bales, and to this end is provided novel guiding or receiving means for said block, from which the latter is carried into position at the entrance of the pressing chamber without the interruption of the pressing operation.

Another object is to connect the feeder with the pressing plunger directly, in such manner, that these elements usually coöperate to counterbalance each other. The weight of the descending feeder may be utilized in such a system to effect the rapid retraction of the plunger.

Other objects may appear in consideration of the appended detailed description, or by inspection of the accompanying drawings.

The accompanying drawings illustrate the invention.

Figure 1 is a fragmental side view of the press embracing my invention. Fig. 2 is an enlarged plan section on line $x^2$, Fig. 1, but shows only a fragment of the press. Certain parts have been broken away so as to display other parts. Fig. 3 is an end view of the press taken from the right in Fig. 1 and is drawn to the same scale as Fig. 1. Fig. 4 is an enlarged fragmental sectional elevation of the press, and is taken on broken line $x^4$—$x^4$, Fig. 2. Fig. 5 is an enlarged fragmental transverse sectional view of the press and is taken on line $x^5$—$x^5$, Figs. 1, 2 and 4. Fig. 6 is an enlarged transverse section along line $x^6$—$x^6$, Fig. 1, and shows the pivotally mounted guiding means for the block detached from the press. Fig. 7 is a diagrammatic sectional elevation through a portion of the press and shows pressed hay in the pressing chamber.

In the press shown in the figures, a member is formed in any suitable manner so as to have a substantially rectangular receiving chamber 1, Fig. 7, and a pressing chamber 2, the latter being practically a continuation of the former, and therefore has its entrance at one side of the receiving chamber. This member is formed with two opposite side walls 3 and 4, Figs. 1, 2 and 5, with a bottom 5 and with a top 6 having a feed hole 7, Fig. 7. Movable pressing means, including the usual plunger 8 and rod 9, and operated by mechanism well-known to the art and therefore omitted from the figures, is adapted to sweep back and forth through the receiving chamber 1 and a short distance into the pressing chamber 2, as indicated by its dotted position in Fig. 7. The upper edge of said plunger runs beneath top plate 6, and several inches of clearance, indicated at 10, Fig. 7, exist between these elements. An apron 11, of equal area and similar shape to the feed hole 7, is mounted on the upper face of the rectangular plunger 8 and is adapted to reciprocate with the same. It will be understood, of course, that while the press is in operation the plunger is made to reciprocate constantly between its initial or retracted position, shown full in Fig. 7, and its extended or final position, shown dotted in the same figure. While said plunger is moving from its initial to its final position it sweeps the hay, previously fed into receiving chamber 1, through same and into the pressing chamber 2 where it presses it against the hay already compressed therein. It is well known that the rear of the pressing chamber is open to the ordinary tail guides 12, Fig. 1, and that as the pressing operation continues the hay is forced outward from pressing chamber 2 onto tail guides 12 where the bale wire may be bound around the bale. Usually the tail guides are sufficiently long to hold several bales, and these are moved outward along the tail guides by each compression stroke of the plunger, it being noticed that the said bales constitute both the blocking wall and the blocking forces against which the plunger compresses the new charge of hay. As the plunger reaches its extended dotted position, Fig. 7, the apron or pan 11 lies immediately beneath the feed hole 7 and substantially seals the same. At this period of the cycle an attendant or laborer pitches the new charge of hay through opening 7 onto apron 11. As the plunger and apron are then retracted toward their initial and full positions, Fig. 7, the edge of the top plate 6, which forms the forward extremity of feed hole 7, encounters and repels the hay off apron 11, so as to slide the charge of hay off the retracting apron and to leave it spread over the feed hole 7. Were it not for the binding and spreading properties of long hay the charge might fall freely through the feed opening onto the bottom of the receiving chamber, but ordinarily some feeding operation is necessary, and an efficient novel form of feeding mechanism will now be described.

The feeding mechanism, embraced in this invention, essentially comprises a feeder or feeder head 13 adapted to operate and to pass into the receiving chamber 1 with a dropping or falling action, and its lower portion is provided with suitably positioned prongs, so that the charge of hay is carried through feed hole 7 and is evenly distributed on the bottom plate 5 of receiving chamber 1. The body of the feeder or feeder head is built with two sets of similarly formed stays 14 and 15 placed one above the other, Fig. 1, and each set comprises two separate stays located, as shown in Fig. 2, on opposite sides of said feeder body. Rigidly secured between said stays are the transversely extending uprights 16 and 17, Figs. 1, 2 and 4, and to the lower extremity of said uprights are secured the serrated end prongs 18 and 19. Between the transverse uprights 16 and 17 is securely attached the central cross piece or upright 20, and on either side of the lower extremity of said cross piece are securely attached two serrated cross prongs 21 and 22, best shown in Fig. 5. When prongs are disposed as above on a linearly operating feeder it is obvious that the charge of hay will be carried through the feed hole 7 and will be evenly distributed on the bottom plate 5 of said receiving chamber.

Any suitable means, preferably including a cable 23 and a bell crank 24, is used to connect the feeder with plunger 8 of the pressing means, so that motion may be transmitted from said pressing means to the feeder for operating the latter from the former; and it will be noticed that the cable and bell crank coöperate in such manner that a given motion of the pressing means produces a greater or magnified motion of the feeder. The cable 23 is connected to feeder 13 by means of a looped connection 25 passing through an aperture 26, Fig. 4, in the rigidly attached cross piece 27 of the feeder. Directly above the center of the feeder is located a pulley 28, and after passing over same the cable 23 is rigidly attached at 29 to the extremity of the longer leg 30 of bell crank 24. From this point the connection to the pressing means may be continued in various ways, but the preferable construction indicated in the figures shows cable 23 continued from connection 29 and passing loosely over a cylindrical rod 31 at the extremity of the shorter leg 32 of the bell crank 24; it being understood that the cable is not fixedly attached to rod 31. From this rod the cable passes beneath the guide pulley 33 and is connected by plate 34 and bolt 35, Fig. 2, to pressing plunger 8 and apron 11. The bell crank 24, of course, may be designed and constructed in any suitable manner and is pivotally mounted in bearings 36; while the pulley 33 is supported in a bracket 37 spanning side plates 3 and 4 of the receiving chamber, and being securely attached and supported on same by means of rivets 38, Fig. 1.

In Fig. 1 plunger 8 is shown at its extreme retracted position, so that the feeder correspondingly has its lowest extreme feeding position. As the pressing plunger passes forward through the receiving chamber 1 to sweep the hay from same into the pressing chamber 2, the cable 23 will operate to obviously raise feeder 13 out of the receiving chamber, there being sufficient clearance between the plunger head and prong 19 of the feeder to permit the removal of the latter from the receiving chamber without collision, or other interference, with the former. With a cable coöperating with a bell crank proportioned as in the figures, the feeder motion will be magnified to approximately four times the plunger motion, so that the feeder will be raised to pulley 28, while the plunger sweeps to its extreme extended position in pressing chamber 2. As has been previously described the charge of hay is loaded onto apron 11, while the plunger is in this extended position, and as the apron and plunger are withdrawn with great rapidity, the feeder will fall almost in a substantially free manner from pulley 28 into receiving chamber 1 and will feed the charge of hay through feed hole 7 to the bottom of the receiving chamber.

In order to accurately guide the feeder suitable guiding means, including the four angle iron tracks 39, are provided. The upper stays 14 of the feeder 13 carry suitable guide rollers 40 running in guide tracks 39, but the lower stays 15 need not necessarily be provided with such guide rollers. The lower portion of guide tracks 39 pass along side plates 3 and 4 of the receiving chamber, and are securely attached thereto by bolts or other suitable means 41, Fig. 1. Between each of these angle-iron guides and side plates 3 or 4, and rising to a height substantially flush with the upper edge of said side plates, are the square hollow pipe sections 42, one of which is displayed fully in Figs. 2, 4 and 5. In each of these pipe sections 42 is seated a bolt 43 and resilient cushion spring 44 normally adapted to extend beyond and out of the upper portion of said sections. With the construction just described, the extremities of stays 15 are seen to be in alinement with springs 44, so that the latter contact with the former for cushioning and gradually arresting the motion of the feeder near the end of its drop, and by this cushioning all shocks to the feeder and press body are avoided.

An important feature in the mechanism hereinbefore described is the balancing or counterbalancing relation which exists between the directly connected feeder and plunger. By considering the relations between the short horizontal bell crank leg 32, the long upright leg 30, and cable 23, it is clear that these parts coöperate to raise the feeder most rapidly at the beginning of its ascent, Fig. 1, and therefore that the maximum consequent strain or resistance will be transmitted to the plunger while this element is starting forward from its retracted position, Fig. 1. At this early portion of the plunger stroke, the same suffers no appreciable resistance from the loose hay in the receiving chamber, so that it is then easily able to supply the increased power demand of the rapidly rising feeder. As the plunger, however, approaches the pressing chamber, and its effort is required chiefly to press the hay, the cable and bell crank legs assume such position and relation that the feeder is only rising slowly toward the upper portion of its stroke. Very little power, therefore, is required to operate the latter at the time pressing plunger 8 is subject to its severe pressing action.

In addition to securing the foregoing desirable distribution of power required from the plunger at various portions of the stroke, the bell crank arrangement, whereby the feeder is rapidly elevated at the beginning of its ascent, has the following valuable feature: As the plunger advances into the receiving chamber and apron 11 passes beneath the feed hole 7, the operator commences immediately to load the new charge of hay upon the advancing apron 11. Quick action from the operator is necessary in order that the hourly pressing capacity may be reasonably high. By the aforesaid rapid initial ascent of the feeder, therefore, this element speedily withdraws itself and makes it possible for the operator to load his hay onto apron 11 from the start. Obviously if feeder 13 ascended with a sluggish movement, the operator would be hampered in loading the apron, and the consequent lost capacity would be undesirable. After the plunger has pressed the charge of hay to its full extent, and the feeder has been raised to its upper limit, the potential energy used in the raised feeder may be adequately used for rapidly retracting the plunger to its initial position, Fig. 1. Sometimes separate mechanism requiring separate applications of power have been used to operate the plunger and the feeder, but by the counterbalanced relation and coöperation of these elements as connected and assembled in this invention, the operation of the one serves to retract the other, and vice versa.

The alternate storing of energy in the feeder, with the subsequent dispersion of same to effect the retraction of the plunger, is another valuable feature of this invention.

In operating the press, as previously described, the hay is continually forced by the plunger into and through pressing chamber 2 against the resistance of the bales, which are thereby being slid along rear portion 12. After a sufficient amount of hay has been forced into and through pressing chamber 2, a block, usually of wood and formed to pass nicely into said pressing chamber, is inserted into the receiving chamber and is ultimately forced along by the continued operation of the plunger. Such a block is inserted between each bale, and, in addition to separating the bales from each other, affords considerable assistance to an operator in binding the wire around the bale while same is moving along the rear portion 12.

Considerable and avoidable delay has always been experienced when the spacing blocks were inserted into prior forms of presses, and the reasons for this delay will now be explained.

More or less clearance 10 is usually allowed between plunger 8 and top plate 6 of pressing chamber 2. Because of the uneven and inefficient distribution of hay as fed into the receiving chamber by the prior forms of pivotally mounted feeders, there has always been a marked tendency for long hay to creep over the upper face of plunger 8 while said hay was being swept through the receiving chamber. The clearance 10 aforesaid was practically necessary in order to minimize the tendency of this projecting hay to plug the plunger by packing and clogging between the top plate 6 of the pressing chamber and the upper face of the plunger 8. Despite the clearance, however, the plunger was frequently plugged to the detriment of the press; but even during the smooth operation of the plunger a long hard sheath of hay 45, Fig. 7, popularly termed a tail, was usually left projecting into the receiving chamber from the upper portion of the pressing chamber. When the time for inserting the block came the operator did not supply a charge of hay onto apron 11, and instead used his fork to turn down the hard tail 45 against the body of hay already pressed into chamber 2. The plunger then advanced through the empty receiving chamber and operated to force the hard tail into the body of the prospective bale. The operator failed to supply the next charge of hay also onto apron 11, and instead dropped the block loosely into receiving chamber 1 at the entrance of the pressing chamber 2. When the plunger again advanced through the empty receiving chamber it served to force the block against the hay in chamber 2 and to move same through said chamber a short distance. From this it will be seen that two plunger strokes or two charges were missed each time a block was inserted, and it requiring approximately ten plunger strokes to produce a bale, the foregoing operation obviously resulted in a loss usually equal to one-fifth of the total press capacity. By the provision of novel mechanism now to be described, and including means for receiving and guiding said block, and means for forcing the block from same into a position at the entrance of said pressing chamber, the aforesaid lost capacity may be conserved to the press.

Approximately above the entrance to the pressing chamber is pivotally mounted the element 46 having a back portion 47, side portions 48 and front portions 49, the latter being spaced apart so as to leave an opening 50, Fig. 2; and said element is adapted to receive and guide the usual bale block 51, which in Figs. 1, 2, 6 and 7 is shown positioned within said element. To the back portion 47 are secured two standards 52, Fig. 2, and these carry the pivot pin 53 extending between and beyond the same. At a suitable location on the rear guide tracks 39 are mounted the bearing brackets 54, Fig. 2, adapted to receive pivot pin 53 and thereby pivotally support the element 46. In order that the block 51 may be forced through these guiding means into its position at the entrance of the pressing chamber, the bottom of said guiding means is left open and uncovered; and to prevent the block 51 from normally falling through same two friction springs 55, Fig. 6, are attached to the sides 48, and are adapted to bear against and frictionally restrain the block 51. The feeder is formed with a projecting lug 56 in alinement with opening or slit 50 in element 46, and adapted to contact with block 51 while in the guiding means for the purpose of carrying it downward into position at the pressing chamber entrance.

With the even and efficient distribution of the charge upon the receiving chamber bottom, as secured by use of this invention, the probability of plugging is practically eliminated, but it is found preferable nevertheless to provide clearance 10 between the upper face of the plunger and the top face 6 of the pressing chamber as in presses of prior construction. On account of the efficient feeding, however, the tail 45, which extends through this clearance, is reduced to a minimum.

Normally element 46 lies in a horizontal position and when the time for inserting a block arrives, the same is put into position within the receiving or guiding means 46, which means is then pivotally swung into its vertical position. On the next drop of the feeder, lug 56 of same will contact with block 51, and will carry it downward against tail 45 and into position at the pressing chamber entrance. With a block thus mechanically inserted into the receiving chamber the tail may be forced into the bale body without utilizing a separate plunger stroke; and in operating a press having the foregoing provisions a charge is supplied to apron 11 on each stroke of the plunger, so that plunger 8, on its next stroke through the receiving chamber, encounters a full charge of hay and compresses it at the same time that it urges block 51 into the pressing chamber. With this operation therefore the block is inserted without the loss of a single plunger stroke, and the aforesaid wasted pressing capacity is obviously avoided. It is understood, of course, that the block need not be driven into position by the joint operation of feeder 13, but may be propelled by any other suitable mechanism without departing from the broad spirit of the invention. Also the member wherein the receiving chamber 1 and pressing chamber 2 are formed may be of one or more parts and of various constructions not limited to the particular diagrammatic form hereinbefore described.

From the foregoing detailed description it is believed that the construction and mode of operation of the novel mechanism for presses, embraced in this invention, will be clear.

I claim:

1. In a press of the character described, a member formed with a receiving chamber and a pressing chamber, pressing means adapted to sweep through said receiving chamber, a feeder adapted to sweep into said receiving chamber along a substantially straight vertical line, a cable for transmitting motion from said movable pressing means to said feeder, and a lever means for causing said cable to impart a motion to the feeder which is greater than the motion of the pressing means.

2. In a press of the character described, a member formed with a receiving chamber and a pressing chamber, movable pressing means adapted to sweep through the receiving chamber, a feeder adapted to sweep into said receiving chamber along a substantially straight vertical line, means constantly and operatively connecting said pressing means with said feeder, said means including a cable, and a bell crank for transmitting motion from said pressing means to said feeder in such manner that a given motion imparted to the pressing means produces a greater motion of the feeder.

3. In a press of the character described, a member formed with a receiving chamber and a pressing chamber, pressing means adapted to sweep through said receiving chamber, a feeder adapted to sweep into said receiving chamber along a substantially vertical line, a cable connecting said pressing means with said feeder, a bell crank having a long upstanding leg and a short lower leg, said bell crank coöperating with said cable.

4. In a press of the character described, a member formed with a receiving chamber and a pressing chamber, pressing means adapted to sweep through said receiving chamber, a feeder adapted to sweep into said receiving chamber along a substantially straight vertical line, a cable connecting said pressing means with said feeder, a pivotally mounted bell crank coöperating with said cable, said bell crank having a long upstanding leg above and a short leg below, said cable being firmly attached to said long upstanding bell crank leg.

5. In a press of the character described, a member formed with a receiving chamber and a pressing chamber, pressing means adapted to sweep through said receiving chamber, a feeder adapted to sweep into said receiving chamber along a substantially straight vertical line, a pulley located above said feeder, a pivotally mounted bell crank, said bell crank having a long upstanding leg above and a short leg below, and a cable connecting said pressing means with said feeder, said cable being firmly attached to said long upstanding bell crank leg; and said cable also passing over said pulley.

In testimony whereof, I have hereunto set my hand at Los Angeles, California, this 13th day of January 1913.

FRASURE E. GROOVER.

In presence of—
JAMES R. TOWNSEND,
ROBERT P. STEPS.

---

Copies of this patent may be obtained for five cents each, by addressing the "Commissioner of Patents. Washington, D. C."